United States Patent

Horiuchi et al.

[11] Patent Number: 5,991,356
[45] Date of Patent: Nov. 23, 1999

[54] RADIATION TOMOGRAPHY METHOD AND APPARATUS

[75] Inventors: Tetsuya Horiuchi; Makoto Gono, both of Tokyo, Japan

[73] Assignee: GE Yokogawa Medical Systems, Limited, Tokyo, Japan

[21] Appl. No.: 09/085,523

[22] Filed: May 26, 1998

[30] Foreign Application Priority Data

Jul. 24, 1997 [JP] Japan .................................... 9-198362
Jan. 23, 1998 [JP] Japan .................................. 10-011347

[51] Int. Cl.[6] ..................................................... A61B 6/03
[52] U.S. Cl. ................................................ 378/8; 378/901
[58] Field of Search .............................. 378/4, 8, 20, 901

[56] References Cited

U.S. PATENT DOCUMENTS 5,586,201 12/1996 Whiting et al. ......................... 378/98.2
5,832,051 11/1998 Lutz ............................................ 378/8

FOREIGN PATENT DOCUMENTS 0 026 494   4/1981   European Pat. Off. .
62-227324  10/1987   Japan .
 4-49952    2/1992   Japan .
 4288149   10/1992   Japan .

*Primary Examiner*—David Vernon Bruce
*Attorney, Agent, or Firm*—Moonray Kojima

[57] ABSTRACT

In order to obtain a tomographic image close to a stationary image using opposite view data, a radiation tomography method and apparatus are provided for measuring projection data representing a subject by radiation beams in a plurality of view directions around the subject; calculating estimated projection data for each of the plurality of view directions by performing a weighting calculation on data elements of the projection data generated by radiations which transmit through the same path in opposite directions so that a desired time phase for the subject is centrally weighted; and producing a tomographic image of the subject based on the estimated projection data.

9 Claims, 15 Drawing Sheets

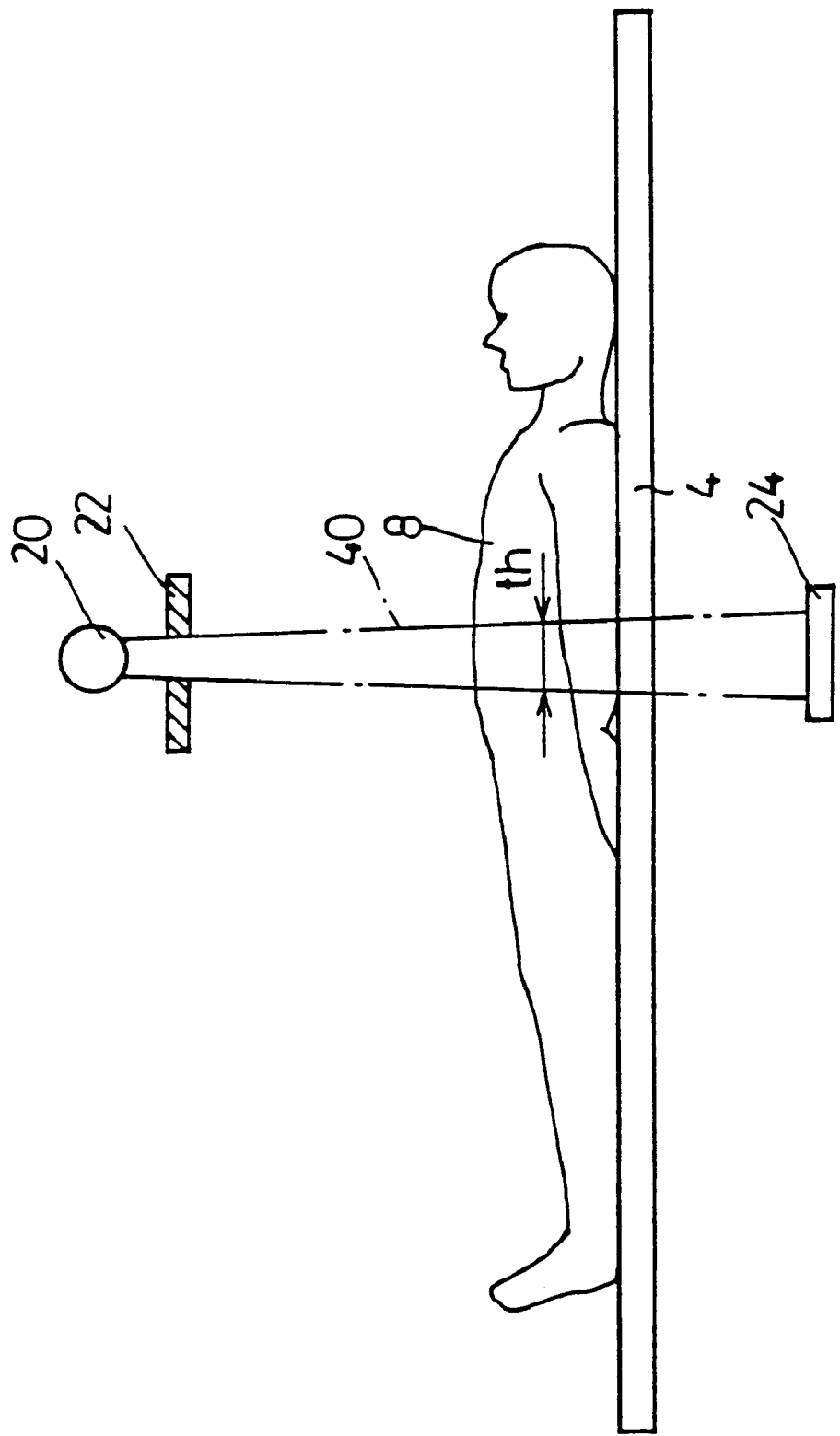

RADIATION TOMOGRAPHY METHOD AND APPARATUS

BACKGROUND OF THE INVENTION

The present invention relates to a radiation tomography method and apparatus for sequentially measuring projection data of a subject in a plurality of view directions around the subject by radiations transmitting through a plurality of paths, and producing a tomographic image of the subject based on the projection data.

Radiation tomography apparatuses include the x-ray CT (computed tomography) apparatus, for example. In the x-ray CT apparatus, x-rays are employed as radiation. The apparatus is configured to scan a subject by a radiation emission/detection apparatus, i.e., an x-ray emission/detection apparatus rotating around the subject to measure x-ray projection data of the subject respectively in a plurality of view directions around the subject, and produce (i.e., reconstruct) a tomographic image based on the projection data.

Due to speedup of the x-ray CT apparatus, a scan can be completed within about 0.8 sec. Accordingly, by scanning the subject synchronously with respiratory monitoring signals from the subject (i.e., patient), and in conformity with a time phase at which the body motion is slow such as the maximum inspiration or expiration time, a tomographic image for the lung field, abdomen etc. which is not much affected by body motion is produced.

When tomography is performed on moving internal organs such as the lung or heart, it is desired to produce a tomographic image close to a stationary image by reducing the required imaging time span to as short as possible. One approach to achieve this is the half-scan technique. The half-scan technique comprises reconstructing an image from image information acquired by a half rotation of radiation beam generation means.

For the heart etc. which move faster than the respiratory motion, since the magnitude of the motion is large within a scan time even as short as 0.8 sec., conventional scanning techniques do not provide satisfactory imaging. Thus, an imaging method employing a heart-gate scan technique is practiced.

The technique comprises: continuously scanning a subject a plurality of times over multiple cardiac strokes while monitoring ECG (electrocardiographic) signals; sorting the acquired projection data by phase based on the ECG signal; and reconstructing a tomographic image of the heart at each phase based on the sorted projection data.

However, the half-scan technique cannot provide high enough image quality because of the low accuracy of the acquired data. Moreover, in computed tomography, an appropriate estimating calculation (e.g., interpolation) is conventionally performed on view data which are opposite each other obtained by opposite radiation beams to improve the image quality, but the opposite view data is not acquired with the half-scan technique, and it is impossible to perform such a processing for improving the image quality.

Furthermore, when the scan is performed synchronously with the respiration, it is difficult to completely avoid the body motion effect with a scan time of 0.8 sec. or slightly less, and therefore a tomographic image having a satisfactory image quality is not always produced. Also, the heart-gate scan technique requires a scan over multiple cardiac strokes, resulting in an increased scan duration and hence an increased x-ray exposure on the subject.

SUMMARY OF THE INVENTION

It is an object of the present invention to provide a radiation tomography method which enables a tomographic image close to a stationary image to be obtained using opposite view data, and an apparatus which is able to implement the method.

In accordance with a first aspect, the present invention provides a radiation tomography method comprising the steps of: measuring projection data representing a subject by radiation beams in a plurality of view directions around the subject; calculating estimated projection data for each of the plurality of view directions by performing a weighting calculation on data elements of the projection data generated by radiations which transmit through a same path in opposite directions so that a desired time phase for the subject is centrally weighted; and producing a tomographic image of the subject based on the estimated projection data.

In accordance with a second aspect, the present invention provides a radiation tomography apparatus comprising: radiation beam generation means for generating a radiation beam; measurement means for sequentially measuring projection data representing a subject by the radiation beam in a plurality of view directions around the subject; estimated projection data calculation means for calculating estimated projection data for each of the plurality of view directions by performing a weighting calculation on data elements of the projection data generated by radiations which transmit through a same path in opposite directions; control means for controlling the weighting calculation so that the weighting calculation is performed centered on a desired time phase for the subject; and image production means for producing a tomographic image of the subject based on the estimated projection data.

In the first or second aspect of the invention, it is preferred that a start time for the weighting calculation is regulated based on a periodic signal from the subject in order to obtain a tomographic image at an appropriate time phase.

If the lung of the subject is the examined object, for example, it is desirable to control the weighting calculation based on the periodic signal generated by respiration. If the heart of the subject is the examined object, for example, it is desirable to control the weighting calculation based on the periodic signal generated by pulsation of the heart.

In the latter case, in order to obtain a tomographic image at an arbitrary cardiac stroke phase from data measured for one scan, it is preferred to perform the measurement of the projection data representing the subject over a time equal to one cardiac stroke cycle, and align a center which is principally weighted with a desired phase of a cardiac stroke.

Moreover, in the first or second aspect of the invention, the image information acquisition processing with the measurement weighted based on the ECG signal generated by the subject may be performed a plurality of times to produce tomographic images at a plurality of time phases of a cardiac stroke.

In accordance with a third aspect, the present invention provides the radiation tomography apparatus as described regarding the second aspect, wherein the radiation beam generation means generates a parallel beam.

In accordance with a fourth aspect, the present invention provides the radiation tomography apparatus as described regarding the second aspect, wherein the radiation beam generation means generates a fan beam.

In accordance with a fifth aspect, the present invention provides the radiation tomography apparatus as described regarding the second–fourth aspects, wherein the estimated projection data calculation means performs the weighting calculation by linear interpolation/extrapolation according to time phases at which the projection data which are opposite each other are acquired and the desired time phase.

In accordance with a sixth aspect, the present invention provides the radiation tomography apparatus as described regarding the second–fifth aspects, wherein the desired time phase for use in the control means is a time phase of the maximum expiration of the subject.

In accordance with a seventh aspect, the present invention provides the radiation tomography apparatus as described regarding the second–sixth aspects, wherein the desired time phase for use in the control means is defined at a plurality of points within one cardiac stroke of the subject.

In accordance with an eighth aspect, the present invention provides the radiation tomography apparatus as described regarding the second–seventh aspects further comprising: second image production means for producing a tomographic image of the subject based on the projection data for a plurality of views equivalent to those of a half rotation around the subject; and selection means for selecting the image production means or the second image production means to produce one of the tomographic images.

In accordance with an ninth aspect, the present invention provides the radiation tomography apparatus as described regarding the second–eighth aspects, wherein the desired time phase for use in the control means is defined at a plurality of points separated by intervals of a cardiac cycle of the subject, and a plurality of tomographic images produced by the image production means and corresponding to the plurality of time phases which are identical represent different locations in the subject.

In any of the first–ninth aspects of the invention, the radiation is preferably x-rays since practical means for generating, detecting and controlling x-rays are most widely available.

According to the present invention, an effective scan time can be made short, because a desired motion phase of the periodically moving internal organ which is examined is regulated to be centrally weighted when performing the weighting calculation on a pair of projection data elements generated by radiations which transmit through the same path in opposite directions. This enables a high image quality to be achieved in an effective scan time shorter than the actual scan time.

In other words, imaging of a tomographic image close to a stationary image of the object internal organ at a desired time phase can be performed by sequentially measuring projection data representing a subject by radiation beams in a plurality of view directions around the subject; calculating estimated projection data by performing a weighting calculation on data elements of the projection data generated by radiations which transmit through the same path in opposite directions so that a desired time phase is centrally weighted; and producing a tomographic image based on the estimated projection data. Thus, a radiation tomography method and apparatus are realized which provide an effect equivalent to reducing the scan time. That is, according to the present invention, a full scan ensures sufficient data accuracy and allows the estimating calculation to be performed on the opposite view data, and, moreover, a tomographic image close to a stationary image can be produced by obtaining an effect equivalent to that obtained by defining a short imaging time span.

Further objects and advantages of the present invention will be apparent from the following description of the preferred embodiments of the invention as illustrated in the accompanying drawings.

BRIEF DESCRIPTION OF THE DRAWINGS

FIG. 4 is a schematic diagram of the x-ray emission/detection apparatus in the apparatus in accordance with one embodiment of the present invention.

DETAILED DESCRIPTION OF THE INVENTION

Figure 1:
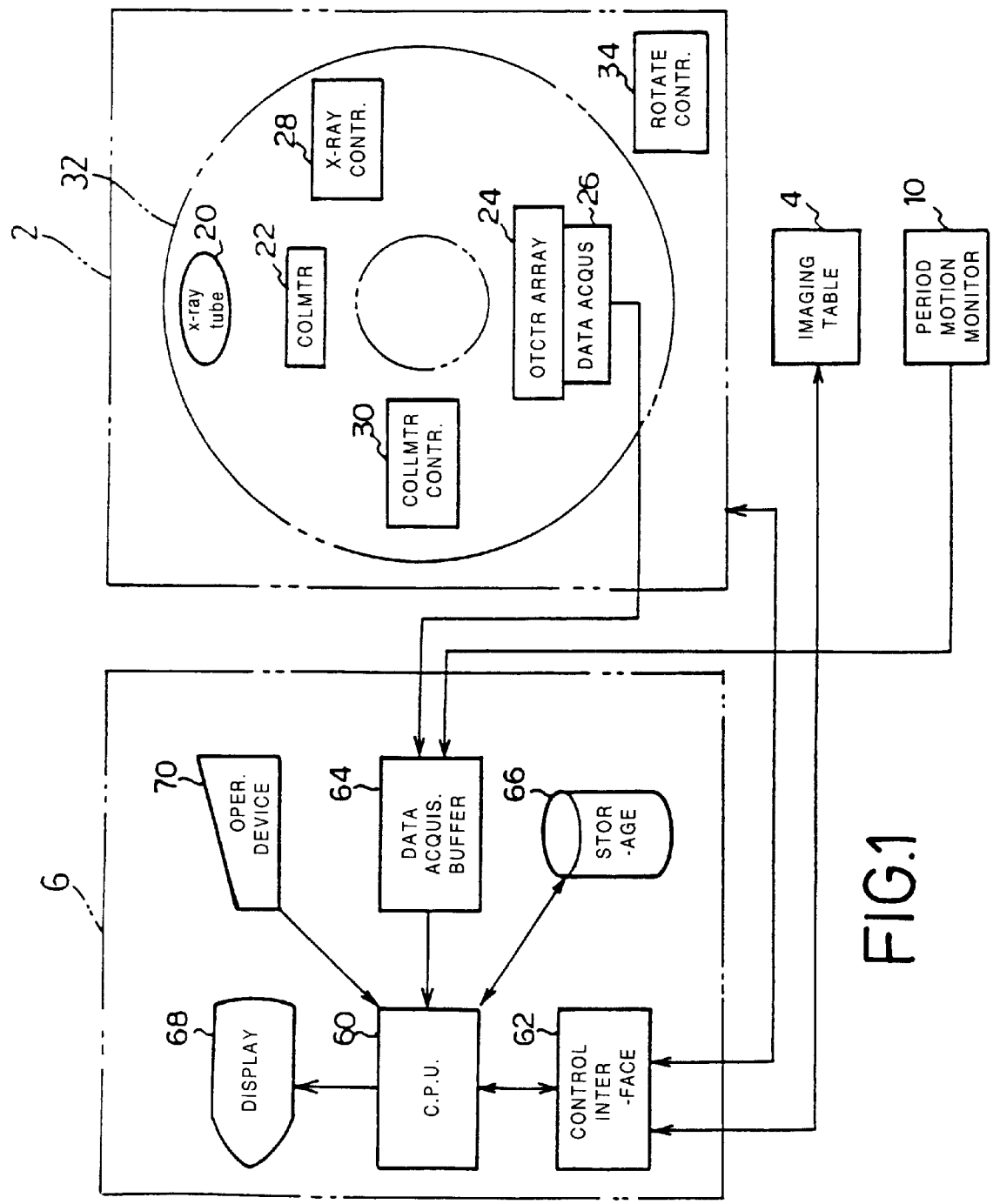
FIG. 1 is a block diagram of an apparatus in accordance with one embodiment of the present invention.

FIG. 1 is a block diagram of an x-ray CT apparatus. The apparatus is one embodiment in accordance with the present invention. Its configuration represents one embodiment of the invention. Its operation represents another embodiment of the invention.

(Configuration)

As shown in FIG. 1, the apparatus is comprised of a scanning gantry 2, an imaging table 4, an operator console 6 and a periodic motion monitor 10.

The scanning gantry 2 has an x-ray tube 20 as a radiation source. X-rays (not shown) emanating from the x-ray tube 20 are formed into, for example, a fan-shaped x-ray beam (i.e., fan beam) by a collimator 22 and impinge upon a detector array 24. The x-ray tube 20 and the collimator 22 are one example of the radiation beam generation means in the present invention. The detector array 24 has a plurality of x-ray detection elements arranged in an array along the width of the fan-shaped x-ray beam. The detailed configuration of the detector array 24 will be described later.

The x-ray tube 20, the collimator 22 and the detector array 24 compose an x-ray emission/detection apparatus. The detailed configuration thereof will be described later. The detector array 24 is connected with a data acquisition section 26. The data acquisition section 26 collects data detected by the individual x-ray detection elements in the detector array 24.

Emission of the x-rays from the x-ray tube 20 is governed by an x-ray controller 28. In the drawing, the connection between the x-ray tube 20 and the x-ray controller 28 is not shown.

The collimator 22 is regulated by a collimator controller 30. In the drawing, the connection between the collimator 22 and the collimator controller 30 is not shown.

The x-ray tube 20—collimator controller 30 are mounted on a rotating portion 32 in the scanning gantry 2. Rotation of the rotating portion 32 is governed by a rotation controller 34. In the drawing, the connection between the rotating portion 32 and the rotation controller is not shown.

The imaging table 4 carries a subject (not shown) into/out of an x-ray irradiation space within the scanning gantry 2. The relationship between the subject and the x-ray irradiation space will be described later.

The periodic motion monitor 10 detects a vital activity signal such as a respiratory signal or an ECG signal from the subject on the imaging table 4. The vital activity signal is an example of a periodic signal in the present invention.

The operator console 6 has a CPU (central processing unit) 60 which is a computer, for example. The CPU 60 is connected with a control interface 62. The control interface 62 is connected with the scanning gantry 2 and the imaging table 4.

The CPU 60 controls the scanning gantry 2 and the imaging table 4 via the control interface 62. The data acquisition portion 26, the x-ray controller 28, the collimator controller 30 and the rotation controller 34 in the scanning gantry 2 are controlled via the control interface 62. In the drawing, the individual connections between these parts and the control interface 62 are not shown.

The CPU 60 is also connected with a data acquisition buffer 64. The data acquisition buffer 64 is connected with the data acquisition portion 26 and the periodic motion monitor 10. The data collected in the data acquisition portion 26 and output signals from the periodic motion monitor 10 are supplied to the data acquisition buffer 64. The data acquisition buffer 64 temporarily stores the supplied data.

The CPU 60 is further connected with a storage device 66. The storage device 66 stores various data, reconstructed images, programs etc.

The CPU 60 is also connected with a display 68 and a operating device 70. The display 68 presents a reconstructed image supplied from the CPU 60 and other information. The operating device 70 is manipulated by an operator, and is configured to supply various commands and information to the CPU 60.

In this embodiment, although the description is exclusively made on an apparatus in which the radiation beam generation means generates a fan beam, the present invention can easily be implemented by an apparatus in which the radiation beam generation means generates a parallel beam as will described later.

Figure 2:
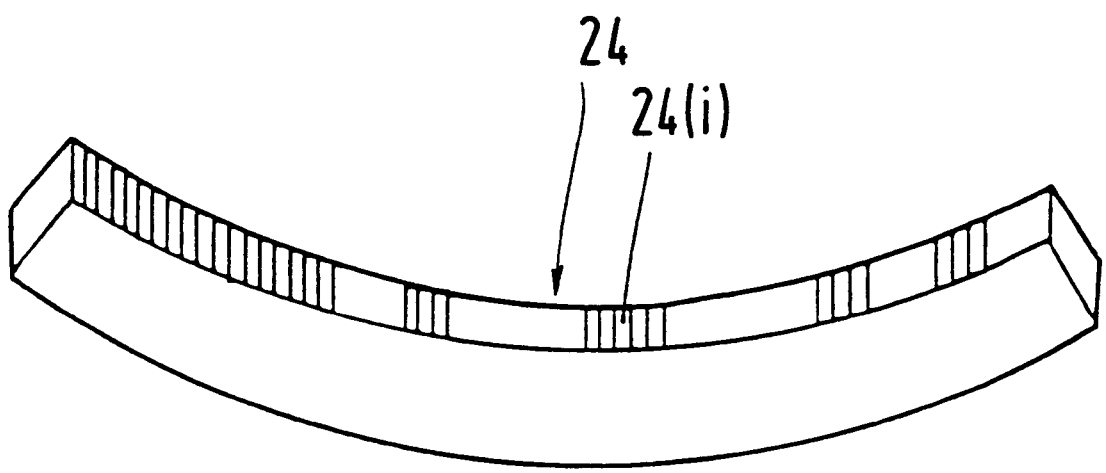
FIG. 2 is a schematic diagram of a detector array in the apparatus in accordance with one embodiment of the present invention.

FIG. 2 schematically illustrates the configuration of the detector array 24 which detects a fan beam from the x-ray source. The detector array 24 is constituted as a multi-channel x-ray detector in which multiple (e.g., 1,000) x-ray detection elements 24(i) are arranged in an arc shape. The symbol "i" represents a channel number and i=1 . . . , 1,000, for example.

The x-ray detection elements 24(i) are solid-state detectors such as scintillation or semiconductor x-ray detectors. It will be understood that ion-chamber type detectors utilizing an ionized gas such as Xe (xenon) gas may also be employed.

Figure 3B:
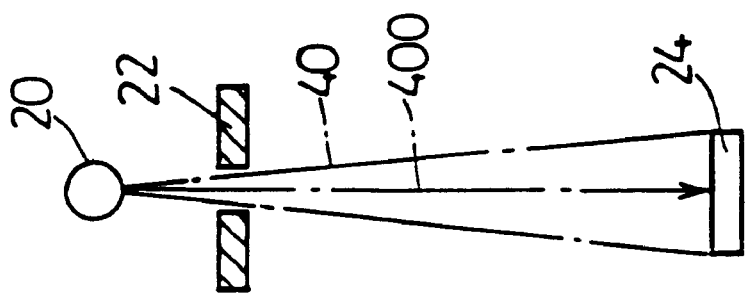
FIGS. 3a–b is a schematic diagram of an x-ray emission/detection apparatus in the apparatus in accordance with one embodiment of the present invention.
Figure 3A:
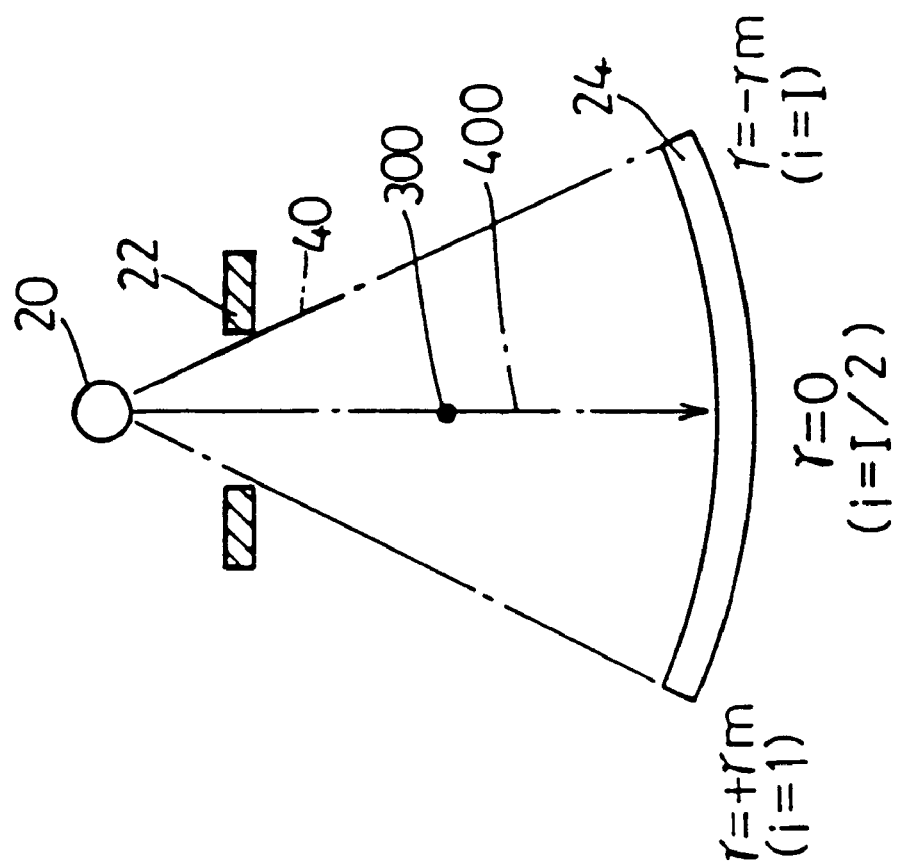

FIG. 3 illustrates the interrelationship among the x-ray tube 20, the collimator 22 and the detector array 24 in the x-ray emission/detection apparatus. FIG. 3(a) is a front view and FIG. 3(b) is a side view. As shown, x-rays emanating from the x-ray tube 20 are formed into a fan-shaped x-ray beam 40 by the collimator 22 and impinge upon the detector array 24. In FIG. 3(a), the extent, i.e., the width of the fan-shaped x-ray beam 40 is shown. In FIG. 3(b), the thickness of the x-ray beam 40 is shown.

A virtual line 400 passing through a focal point of the x-ray tube 20 and the center of rotation 300 of the scanning gantry 2 is defined as an angular reference axis. The angular reference axis 400 extends to reach the center of the detector array 24. Each of the angles formed by virtual lines linking the focal point of the x-ray tube 20 with the respective x-ray detection elements 24(i) and the angular reference axis 400 is referred to as a channel angle $\gamma$. The channel angle $\gamma$ is 0 at the central x-ray detection element 24(I/2) in the detector array 24. The channel angle $\gamma$ is $+-\gamma_m$ at the x-ray detection element 24(1), the leftmost of the detector elements 24 in the drawing, and is $-\gamma_m$ at the x-ray detection element 24(1), the rightmost of the detector elements 24 in the drawing. Since the channel number i and the channel angle $\gamma$ have one-to-one correspondence, the x-ray detection element 24(i) is expressed as an x-ray detection element 24($\gamma$) hereinbelow.

The subject is inserted with the subject's body axis intersecting the fan plane of the x-ray beam 40. This is illustrated in FIG. 4. As shown, a subject 8 rested on the imaging table 4 is inserted with the subject's body axis intersecting the fan plane of the x-ray beam 40. A projection image of the subject 8 sliced by the x-ray beam 40 is projected on the detector array 24. The thickness of the x-ray beam 40 at the isocenter of the subject 8 is the slice thickness th for the subject 8. The slice thickness th is determined by an x-ray passing aperture through the collimator 22.

The x-ray emission/detection apparatus consisting of the x-ray tube 20, the collimator 22 and the detector array 24 rotates (i.e., scans) around the body axis of the subject 8 maintaining their interrelationship. Projection data representing the subject 8 are acquired at a plurality (e.g., 1,000) of view angles per scan rotation.

The number of projection data elements per view is equal to the number of channels of the detector array 24 and is 1,000, for example. The projection data element from each channel represents the intensity of a transmitting x-ray which impinges upon the channel from the focal point of the x-ray tube 20. Accordingly, the projection data formed by, for example, 1,000 x-rays which travel different paths are acquired.

Acquisition of the projection data is performed by a system consisting of the detector array 24—the data acquisition portion 26—the data acquisition buffer 64. The x-ray tube 20, the collimator 22, the detector array 24, the data acquisition portion 26 and the data acquisition buffer 64 are one example of the measuring means in accordance with the present invention.

Figure 5:
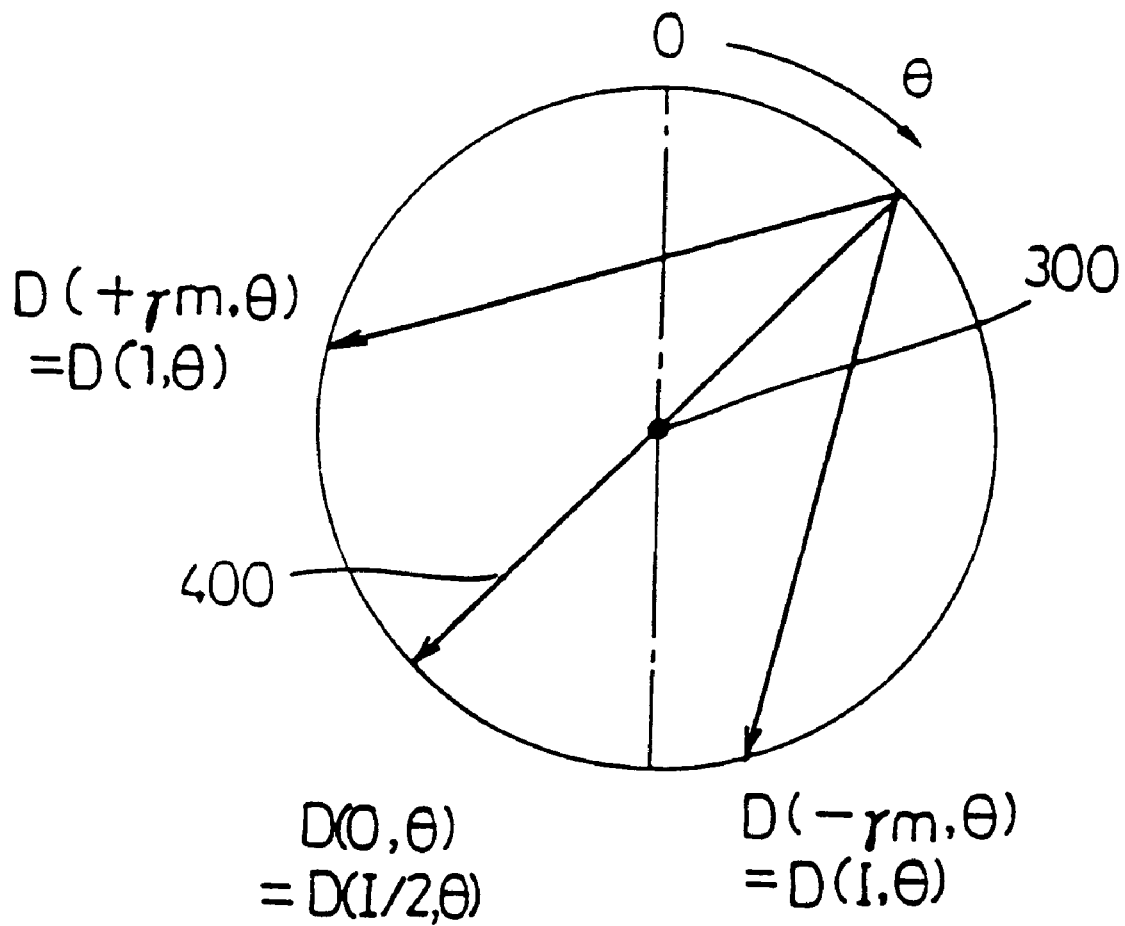
FIG. 5 is a diagram illustrating a relationship between a view angle and view data when a fan-shaped x-ray beam is employed.

A view angle at which the projection data is measured will now be explained with reference to FIG. 5. An angle $\theta$ formed by the angular reference axis 400 and, for example, a vertical axis at an angular position at which the x-ray emission/detection apparatus is placed by rotation is referred to as the view angle. However, the origin from which the view angle θ is measured may be taken at any appropriate position instead of at the vertical axis.

Data acquired at the view angle θ by the x-ray detection element 24(γ) at the channel angle γ is represented as D(γ, θ). For example, if γ=0, then the data is represented as D(0, θ); if γ=+$γ_m$, then D(+$γ_m$, θ); and if γ=−$γ_m$, then D(−$γ_m$, θ)).

Figure 6A:
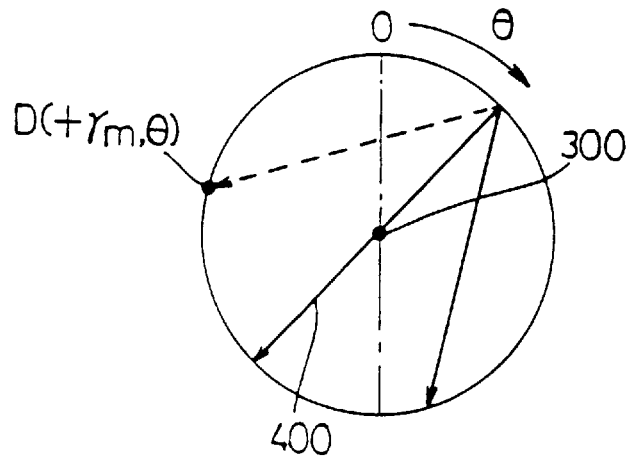
FIGS. 6a–b is a diagram illustrating a relationship between a view angle and view data when a fan-shaped x-ray beam is employed.
Figure 6B:
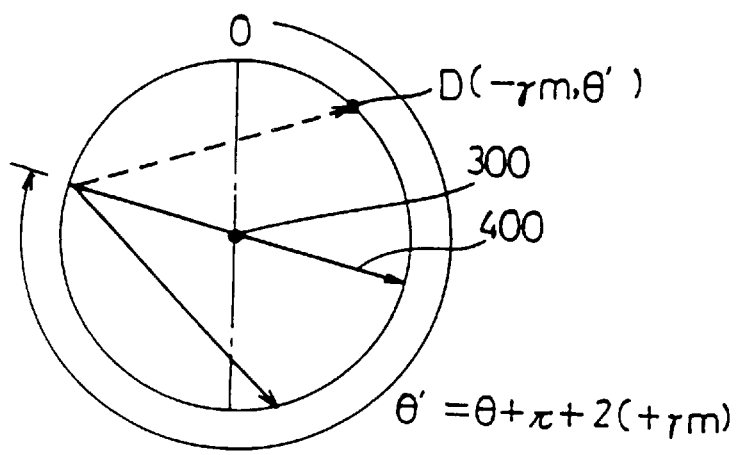

There exists opposite view data for each view data, which is illustrated in FIG. 6. As for the data D(+$γ_m$, θ) shown in (a), its opposite view data is the data D(−$γ_m$, θ') at the view angle θ'=θ+π+2(+$γ_m$) as shown in (b). These data D(+$γ_m$, θ) and D(−$γ_m$, θ') are the projection data acquired by x-rays passing through the same imaging space portion in opposite directions.

Similarly, there exists opposite view data for each of the other channels. Generally the opposite view data for the data D(γ, θ) is D(−γ, θ+π+2γ). Since the view data which are opposite each other are acquired from different view angles, i.e., different rotational locations in the scanning gantry 2, they are different in data acquisition time point.

The CPU 60 finds the respective opposite view data for the projection data acquired in the data acquisition buffer 64. The CPU 60 also calculates estimated projection data by a weighting calculation using a pair of view data elements which are opposite each other. The CPU 60 is an example of the estimated projection data calculation means in the present invention. Also, the CPU 60 is an example of the control means in the present invention. The calculation of the estimated projection data is performed by, for example, using the following equation:

$$D(γ_1, θ_1) = w(γ_1, θ_1) \cdot D(γ_1, θ_1) + w(γ_2, θ_2) \cdot D(γ_2, θ_2). \quad (1)$$

This equation means that the weighting calculation on the opposite view data elements which form a pair gives the estimated projection data for use in producing a tomographic image with a desired time phase centrally weighted.

In the above equation, D($γ_1$, $θ_1$) and D($γ_2$, $θ_2$) are an opposite view data pair, and the relationships between the channel angles $γ_1$ and $γ_2$, and between the view angles $θ_1$ and $θ_2$ are as follows:

$$γ_2 = -γ_1, \quad (2)$$

and $$θ_2 = θ_1 + π + 2(γ_1) \quad (3)$$

FIGS. 7(a)–(d) illustrates how to determine the weighting factor w(γ, θ) in connection with the gantry rotational angle and the channel angle γ. In this embodiment, the view data and its opposite view data are weighted, i.e., multiplied by weighting factors, so that they are proportionated according to the closeness from the angular location π to the radiation source location at the time at which the respective data are generated.

Figure 7A:
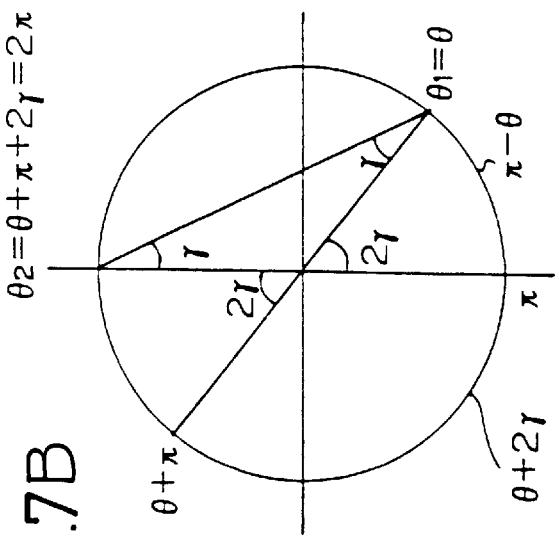
FIGS. 7a–d is a diagram for explaining a relationship among a weighting factor, a gantry angle and a channel angle.

The weighting factors are normalized so that the sum of the weighting factor of the view data and the weighting factor of its opposite view data would be 1. For example, when the radiation source is placed at an angular location θ as shown in FIG. 7(a), its opposite view appears at the location θ+π+2γ and the weighting factor is expressed as:

$$W_a(γ, θ) = (θ + 2γ) / [(π − θ) + (θ + 2γ)] \quad (4)$$
$$= (θ + 2γ) / (π + 2γ).$$

Figure 7B:
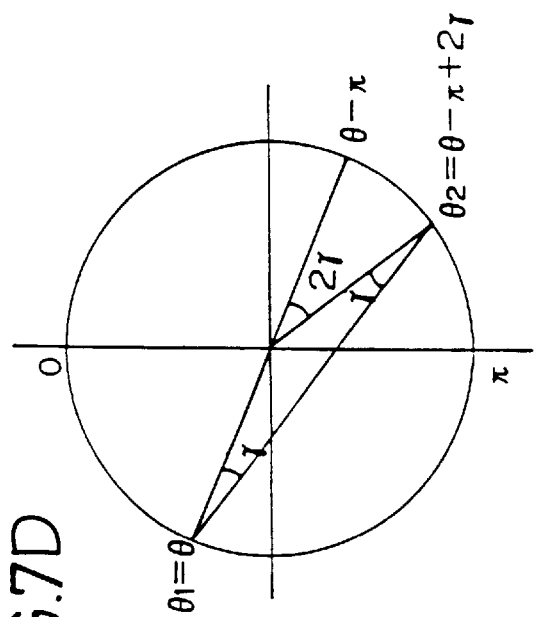

When the radiation source is placed at an angular location θ as shown in FIG. 7(b), its opposite view is placed just at an angular location 2π, and a different form of the weighting factor equation will be derived bounding this angular location.

Figure 7C:
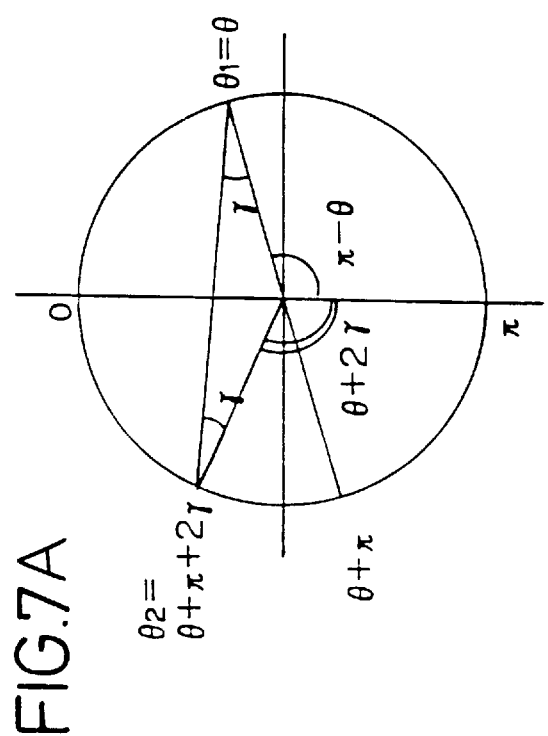

When the radiation source is placed at an angular location θ as shown in FIG. 7(c), the weighting factor is given as follows:

$$W_c(γ, θ) = (θ + 2γ − 2π) / [(π − θ) + (θ + 2γ − 2π)] \quad (5)$$
$$= (2π − θ − 2γ) / (π + 2γ).$$

Figure 7D:
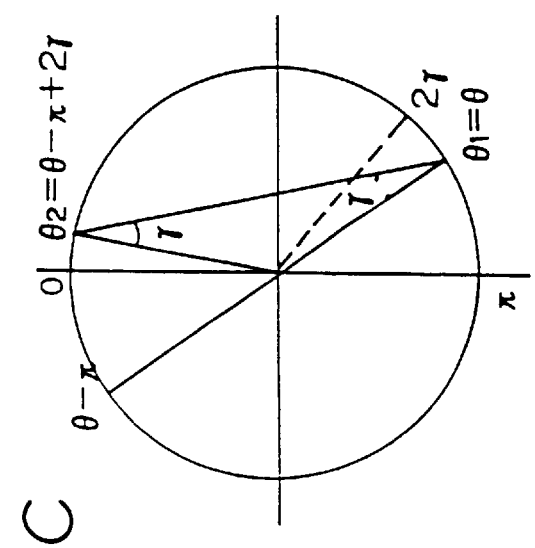

When the radiation source is placed at an angular location θ as shown in FIG. 7(d), the weighting factor is given as follows:

$$W_d(γ, θ) = (2π − θ − 2γ) / [(θ − π) + (2π − θ − 2γ)] \quad (6)$$
$$= (2π − θ − 2γ) / (π − 2γ).$$

Consequently, the weighting factor (γ, θ) for the estimating calculation is given as follows:

$$w(γ, θ) = (θ + 2γ) / (π + 2γ) \text{ when } 0 \leq θ \leq π − 2γ, \quad (7)$$
$$= (2π − θ − 2γ) / (π − 2γ) \text{ when } π − 2γ \leq θ \leq 2π.$$

By giving the weighting factor w(γ, θ) as Eq. (7), the sum of the weighting factors w($γ_1$, $θ_1$) and w($γ_2$, $θ_2$) for the opposite view data is always 1. This is exemplified by the opposite view data pair D(+$γ_m$, θ) and D(−$γ_m$, θ') shown in FIG. 6, wherein the weighting factors are given as follows:

$$w(+γ_m, θ) = (θ + 2γ_m)/(π + 2γ_m), \quad (8)$$

and $$w(-γ_m, θ') = [2π − (θ + π + 2γ_m) − 2(−γ_m)] / [π − 2(−γ_m)] \quad (9)$$
$$= (π − θ) / (π + 2γ_m).$$

Actually their sum is:

$$w(+γ_m, θ) + w(−γ_m, θ') = (π + 2γ_m) / (π + 2γ_m) = 1. \quad (10)$$

The same result is obtained for any other opposite view data pair.

Figure 8:
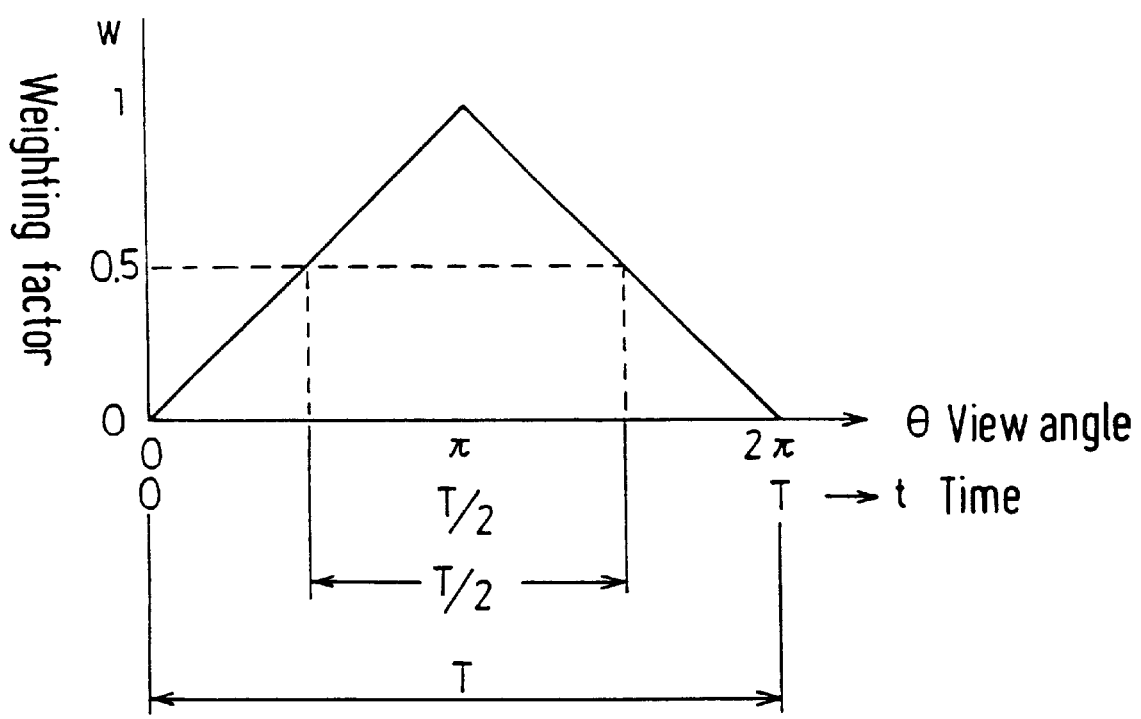
FIG. 8 is a graphical representation illustrating a profile of a weighting factor for use in an estimating calculation in the apparatus in accordance with one embodiment of the present invention.

The variation in the weighting factor w(γ, θ) during one rotation of the scanning gantry 2, that is, during the view angle varying from 0 to 2π is shown in FIG. 8 for the data D(0, θ) as an example. FIG. 8 illustrates the variation in the weighting factor w(γ, θ) for the data D(0, θ) when a tomographic image at θ=π is to be produced. In other words, FIG. 8 shows a function which gives a weighting factor for γ=0, i.e., for the central beam of a plurality of beams which compose a fan beam, and its opposite beam always appears when the gantry rotational angle advances by 180 degrees. This similarly applies to a case in which the radiation beam generation means generates a parallel beam. When the x-ray emission/detection apparatus comprises the parallel beam generating means, the weighting factor is applied to all the beams.

As shown, the weighting factor $w(\gamma, \theta)$ is 0 when $\theta=0$, and linearly increases to reach "1" when $\theta=\pi$, and thereafter linearly decreases to reach "0" when $\theta=2\pi$.

That is, the weighting factor has a profile in which the data is provided with the maximum weight when the view angle $\theta=\pi$, and the data for the views prior to and subsequent to this view are respectively provided with weights which symmetrically decrease centered on the view angle $\pi$. The estimating calculation using such a weighting factor gives the data weighted principally at the location $\theta=\pi$. The estimating calculation of the projection data includes both of interpolative and extrapolative techniques according to a combination of opposite view data.

Since the view angle $\theta$ represents a rotational phase of the scanning gantry 2, a time axis t can be substituted for the abscissa $\theta$ assuming that the rotation is performed at a constant angular speed. In such a case, $\theta=0$, $\pi$ and $2\pi$ correspond to t=0, T/2, and T, respectively, wherein T is a scan time.

As described above, and according to the weighting process performed by the present apparatus, a data profile weighted principally at a location of the rotational phase $\theta=\pi$, i.e., at T/2, can be obtained, and the image quality can be suitably evaluated by the weighting by reconstructing an image based on data equivalent to those of the FWHM (full width at half maximum), for example, centered on the above rotational phase. In this case, the FWHM can be conceptually recognized as corresponding to an effective slice thickness of a helical scan, and it can be used for the evaluation of the image quality by the weighting.

(Operation)

Figure 9:
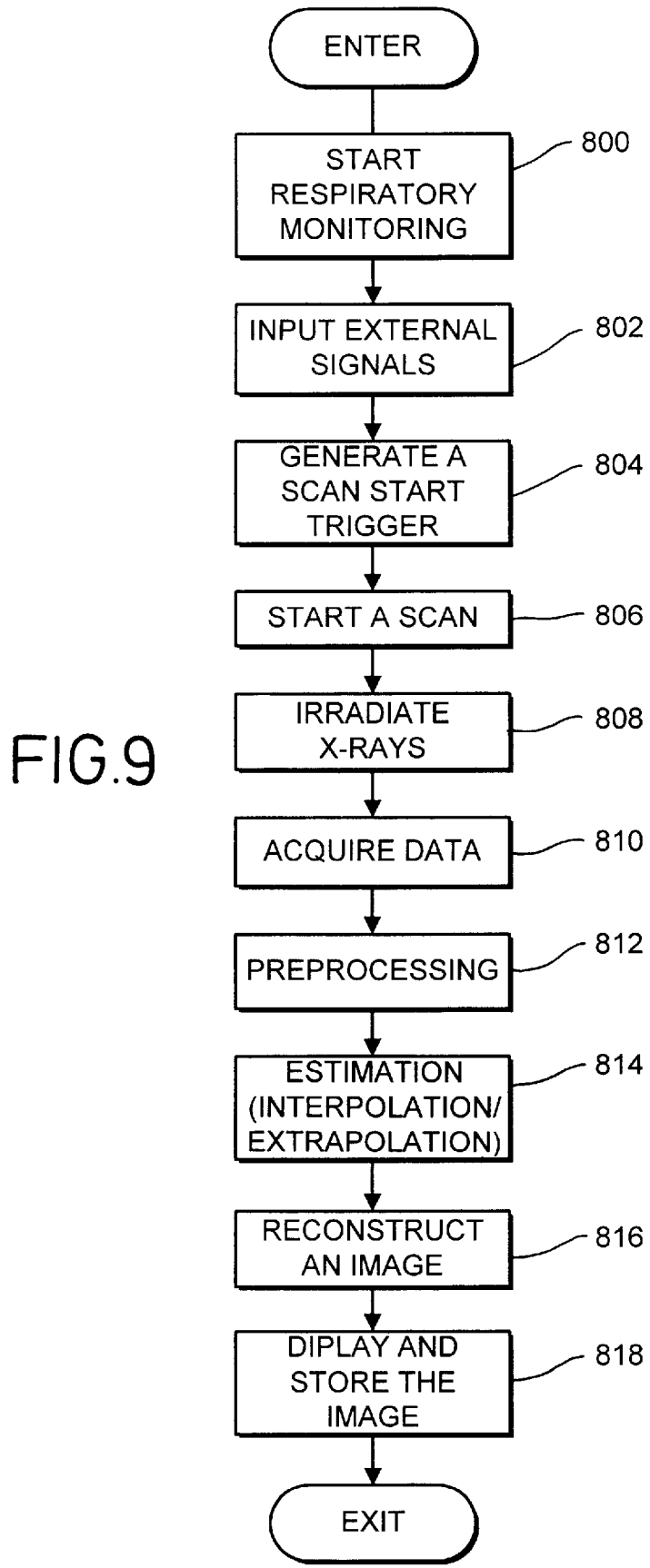
FIG. 9 is a flow chart illustrating the operation of the apparatus in accordance with one embodiment of the present invention.

The operation of the present apparatus will now be described. FIG. 9 is a flow chart of the operation of the apparatus. The operation of the apparatus is started in response to a command supplied to the CPU 60 by the operator via the operating device 70. Thereafter, the operation of the apparatus proceeds under control of the CPU 60.

First, respiration monitoring on the subject is started in Step 800.

Figure 10:
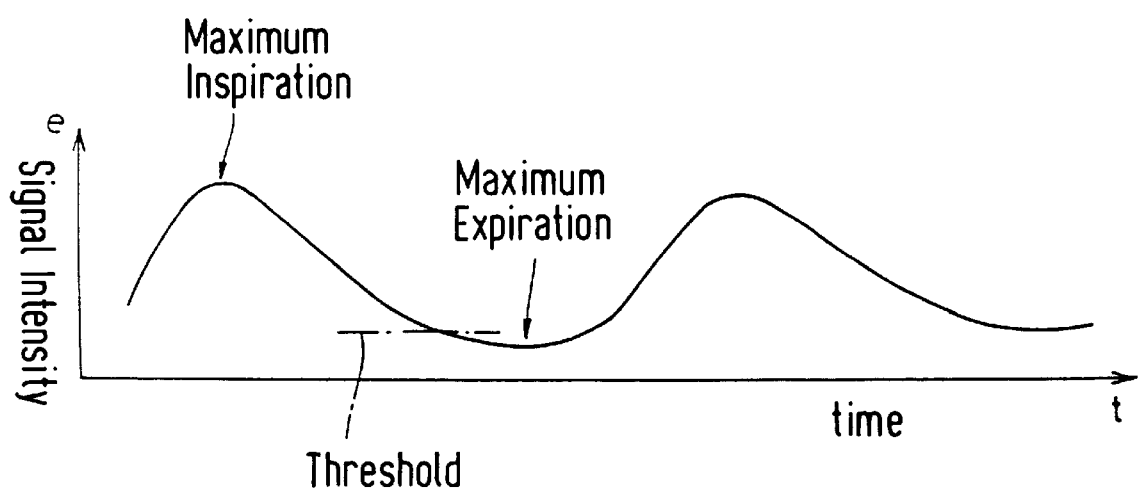
FIG. 10 is a graphical representation showing an example of a respiratory monitoring signal in the apparatus in accordance with one embodiment of the present invention.

Then, external signal input is performed in Step 802 in which the respiratory signal is supplied from the periodic motion monitor 10 to the CPU, and is presented on the display 68 via the CPU 60. Thus a respiratory signal waveform which represents the time phases of the maximum inspiration and expiration is presented on the display 68 as exemplarily shown in FIG. 10. The operator ascertains the respiratory action of the subject 8 based on the presented waveform.

The operator inputs an appropriate threshold for distinguishing the time phase of the maximum expiration, for example, via the operating device 70. Generally, a condition of the subject including the internal organs at the maximum expiration is considered to be closest to the stationary condition. It will be understood that a value for distinguishing the time phase of the maximum inspiration may be defined as the threshold.

When the amplitude of the respiratory signal intersects the threshold value, a scan start trigger is generated in Step 804.

Based on the scan start trigger, a scan is started in Step 806, x-rays are irradiated in Step 808 and data acquisition is performed in Step 810.

Subsequent to preprocessing of the acquired data in Step 812, the estimated projection data as described hereinabove is calculated using a pair of opposite view data elements in Step 814.

In Step 816, image reconstruction is performed based on the estimated projection data, and the reconstructed image is displayed and stored in Step 818.

Figure 11:
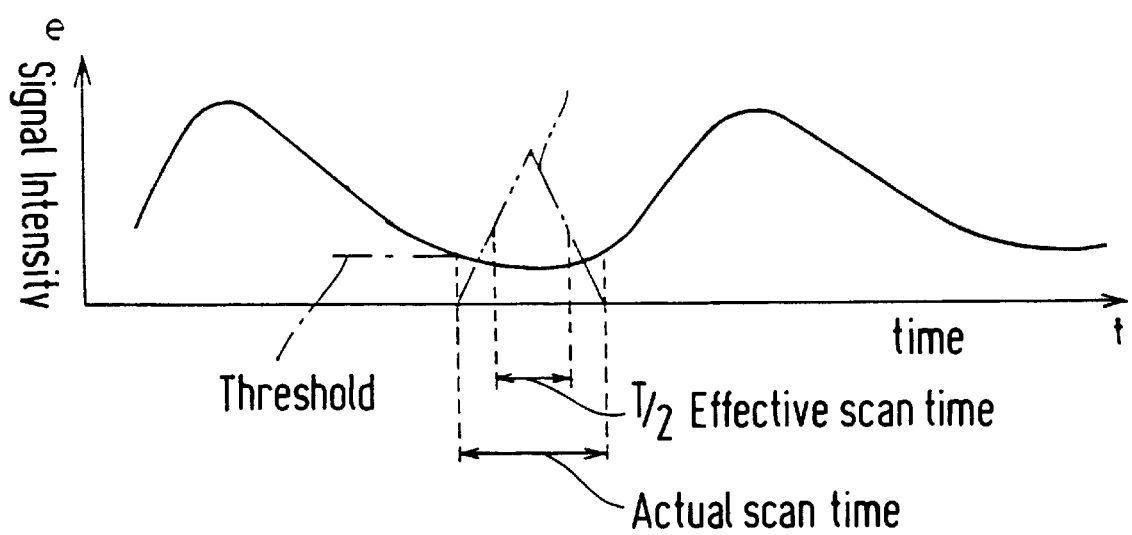
FIG. 11 is a diagram illustrating an example of a relationship between the respiratory monitoring signal and a scan time phase in the apparatus in accordance with one embodiment of the present invention.

Since the above-described estimated projection data has a profile with the time phase of T/2 centrally weighted, image reconstruction may be performed using data acquired effectively over a half of the actual scan time by the scanning gantry 2 centered on the time phase of T/2. This relationship is exemplarily shown in FIG. 11. As shown, when the subject 8 is scanned over a scan time T at the time phase of the maximum expiration, a time T/2 equal to the FWHM of the weighting factor profile can be regarded as an effective scan time corresponding to an effective scan slice thickness of a helical scan.

For example, when the scan time is 0.8 sec., the effective scan time is 0.4 sec. Thus, a tomographic image can be obtained scarcely affected by respiratory body motion of the subject 8.

If an electrocardiograph is employed as the periodic motion monitor 10 instead of the respiratory monitor, a tomographic image can be obtained at a desired time phase of a cardiac stroke in a similar manner as above. The cardiac stroke phase is determined by specifying an appropriate threshold etc. for an ECG signal.

The above-described embodiment comprises the steps of: controlling a weighting calculation so that a desired time phase during one rotation of the gantry is principally weighted; coinciding the time phase with a time phase at which the motion of the internal organs of an examined object is relatively slow; acquiring image information principally at the time phase at which the motion is relatively slow; and producing an image close to a stationary image of the examined object's internal organs. The above image information acquisition procedure may be performed a plurality of times at a predetermined interval and may be used to sequentially observe the motion of the internal organs. That is, a continuous scan is performed over two cardiac strokes, for example, to acquire data during a plurality of rotations.

Figure 12:
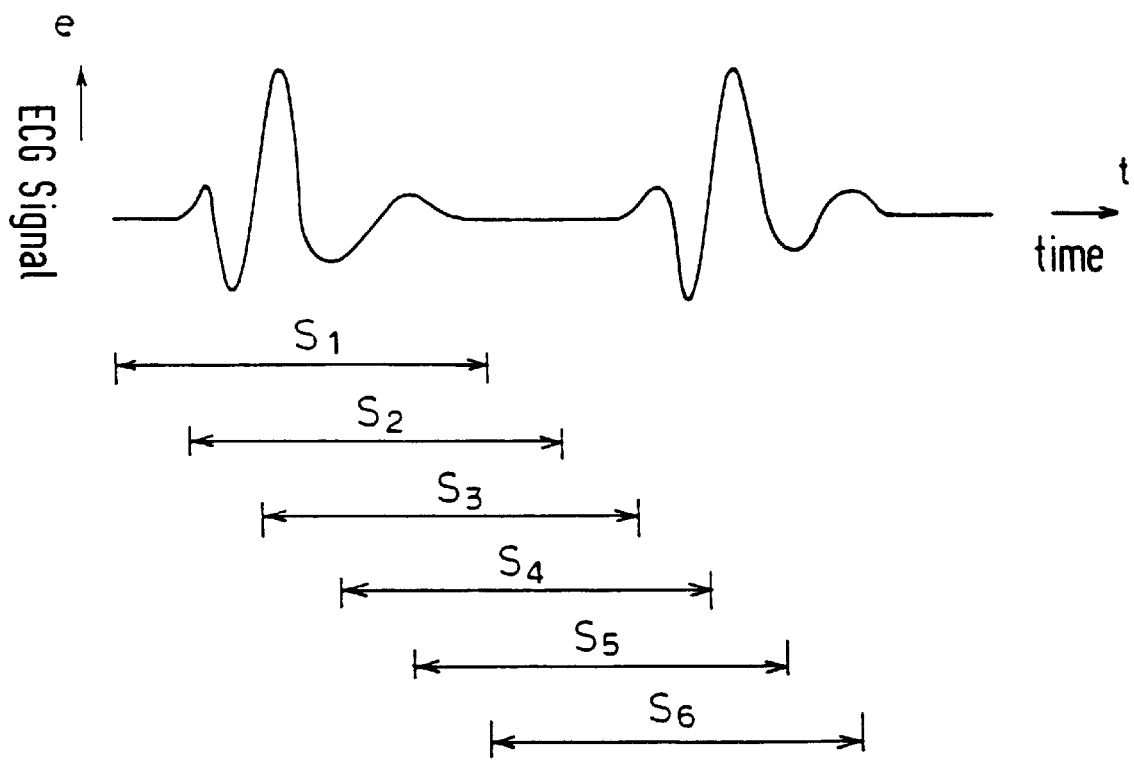
FIG. 12 is a diagram illustrating an example of a relationship between an ECG signal and an image reconstruction time phase in the apparatus in accordance with one embodiment of the present invention.

Among such data acquired, data S1 equivalent to those of the first 360°, as exemplarily shown in FIG. 12, can be used to obtain a tomographic image at one phase by performing image reconstruction from estimated data obtained from a pair of opposite view data elements. Similarly, data S2–S6 can be subsequently processed in the same way as above appropriately shifting a range covering 360° to obtain images at respective phases.

Although the subject 8 is continuously scanned in this case, the x-ray exposure on the subject is considerably lower than by the conventional heart-gate scan technique since the scan time corresponds to two cardiac strokes at most.

If the scan and image reconstruction procedure shown in FIG. 12 is sequentially performed at a plurality of slice locations, a tomographic image at each phase can be imaged at each of the plurality of slice locations. In this case, for example, the R wave (a wave which forms the maximum peak) in the ECG signal can be used as a scan trigger to facilitate aligning of the phases through the plurality of slices. Tomographic images for a plurality of slices at an identical phase can be used to construct a reformation image for an arbitrary slice or a three-dimensional image at every phase.

Figure 13:
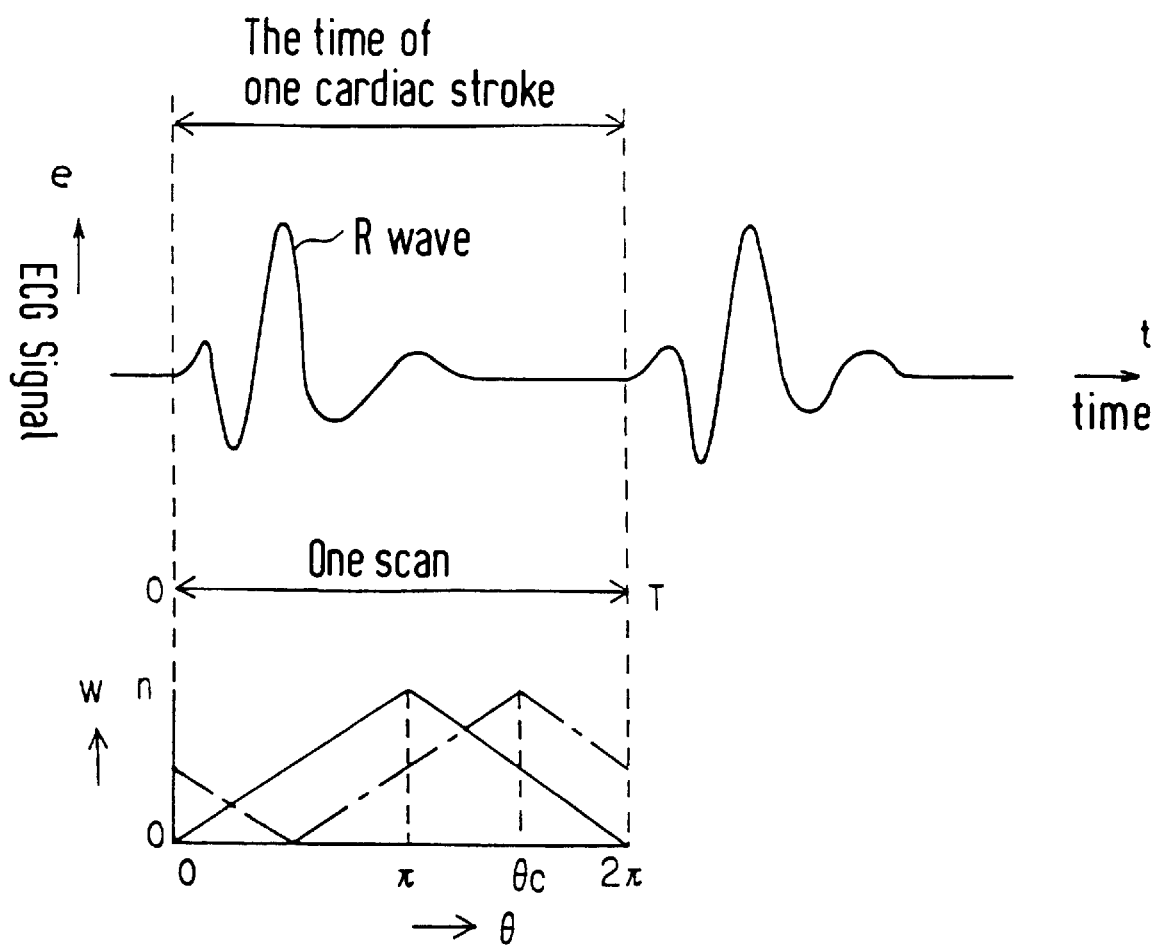
FIG. 13 is a diagram illustrating an example of a relationship between the weighting factor and cardiac strokes in the apparatus in accordance with one embodiment of the present invention.

By regulating the rotational speed of the rotating portion 32 in the scanning gantry 2, the scan time T can be equalized to a time for one cardiac stroke (i.e., a cycle) which is usually about 1 sec. In this case, as exemplarily shown in FIG. 13, view data for all phases within one cycle of the cardiac stroke can be acquired by one scan. Since the cardiac stroke phases of the first and last views in the scan are identical, the cardiac stroke phases make one cycle preserving the continuity.

Due to such a cyclic nature of the cardiac stroke phase, a central location having the maximum weight (referred to as a centrally weighted location hereinafter) can be positioned at a half of a scan rotation ($\theta=\pi$) as indicated by a solid line, or positioned at an arbitrary angular location ($\theta=\theta_c$), as indicated by a dot-dash line, with the weighting factor profile cyclically translated according to the angular location without causing inconsistency in the estimating calculation.

Therefore, by aligning the centrally weighted location with a phase at which the motion is slow, such as diastole of the heart, a reconstructed image can be obtained in which the view data at the phase is given the maximum weight, hence a tomographic image of the heart which is not much affected by motion can be obtained.

Moreover, by aligning the centrally weighted location with a desired cardiac stroke phase, a tomographic image at the phase can be obtained. However, the image quality at a phase involving a rapid motion would be inevitably degraded. In positioning the centrally weighted location, it is preferred that the R wave of the ECG waveform, for example, be selected as a reference location, because the reference location is distinct. Alternatively the centrally weighted location may be defined by using a relative time within-one scan time.

Figure 14:
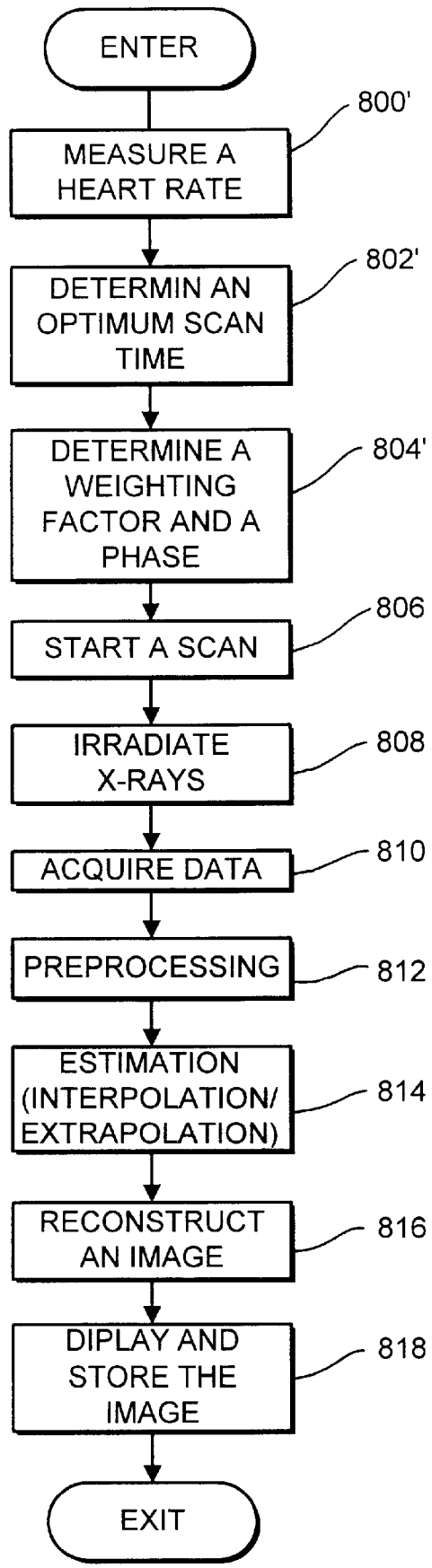
FIG. 14 is a flow chart illustrating the operation of the apparatus in accordance with one embodiment of the present invention.

FIG. 14 is a flow chart illustrating the operation of the present apparatus when the heart is imaged as described above. As shown, a heart rate is first measured in Step 800'. The heart rate is measured based on a signal from the periodic motion monitor 10 such as an electrocardiograph. Then the average time for one cardiac stroke etc. is found from the measurement of the heart rate.

Next, an optimum scan time is determined in Step 802'. The optimum scan time is determined so as to be equalized to the average time for one cardiac stroke, for example.

Then, a weighting factor and a cardiac stroke phase with which the centrally weighted location is aligned are determined in Step 804'.

In Step 806, a scan is started. The scan is performed over the optimum scan time determined in Step 802'. Thereafter, scanning of the subject 8, reconstruction of a tomographic image, display of the reconstructed image etc. are performed according to the same procedure as shown by the flow chart in FIG. 9. One scan over a time equal to one cardiac stroke time, for example, is thus performed, and a tomographic image of the heart is obtained at the cardiac stroke phase as determined in Step 804'.

After the data are acquired, image reconstruction can be performed again on the view data for one scan stored in the storage device 66 with the centrally weighted location shifted, to obtain another tomographic image of the heart at another phase. If necessary, by reconstructing images with the centrally weighted location sequentially shifted, tomographic images of the heart at various phases can be arbitrarily obtained from the view data for one scan. If the view data involving a part having a rapid motion is to be excluded, a segment reconstruction technique may be performed using the view data corresponding to a half scan instead of the above effective scan time-reduced image reconstruction technique in reconstructing an image. That is, according to use, which of the effective scan time-reduced image reconstruction and the segment reconstruction using half-scan view data is to be performed may be selected for the tomographic image to be obtained, and the image reconstruction may be performed according to the selection.

The heart rate may be measured by a more convenient instrument such as a plusimeter, instead of the electrocardiograph. In this case, the cardiac stroke phase (the centrally weighted location) cannot be determined based on the R wave of the EGG waveform. However, a suitable image can be produced by obtaining reconstructed images for a number of centrally weighted locations appropriately defined within a scan time and selecting a suitable image.

Figure 15:
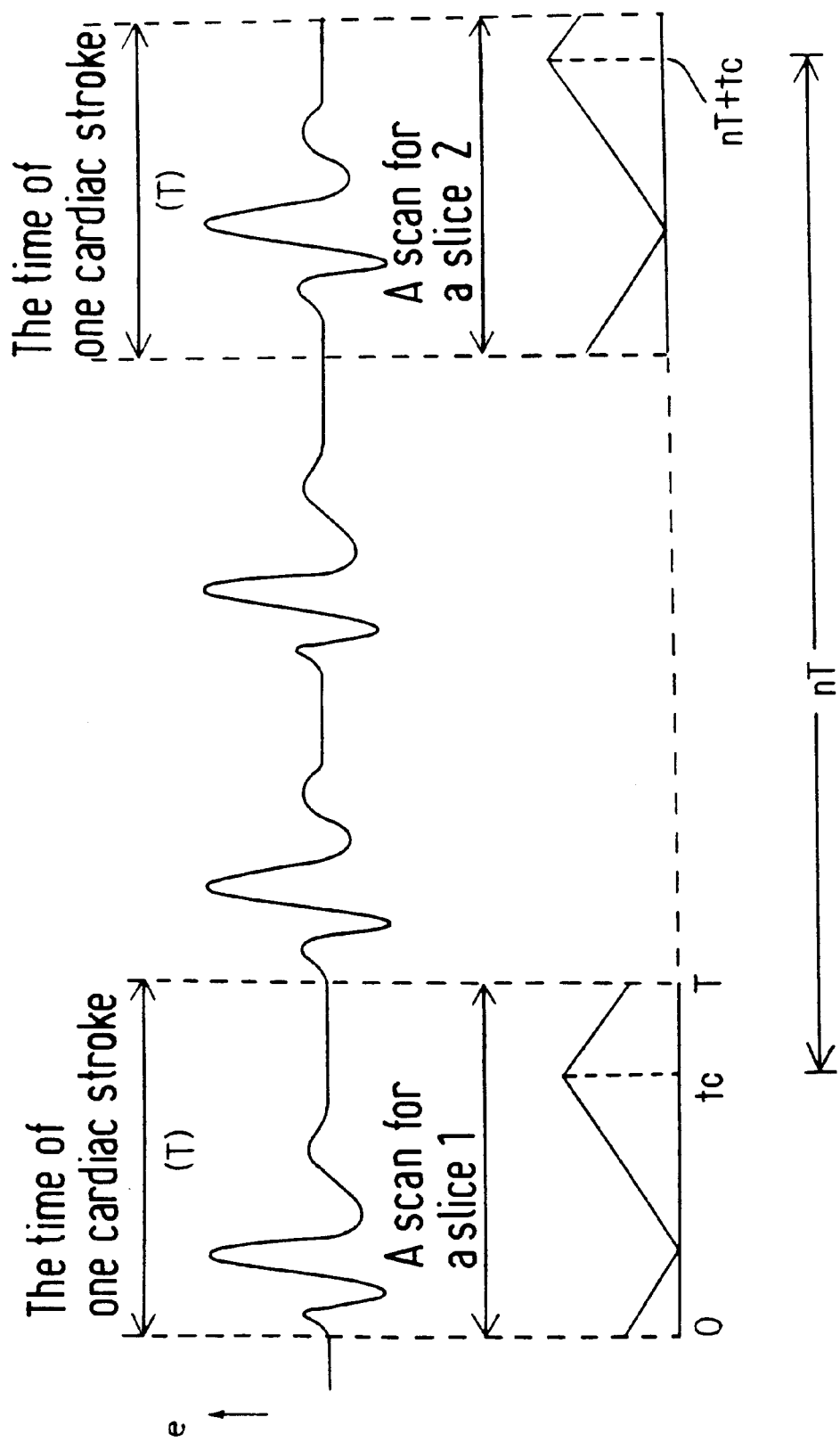
FIG. 15 is a diagram illustrating an example of a relationship between the weighting factor and cardiac strokes in the apparatus in accordance with one embodiment of the present invention.

In the case that the electrocardiograph is not employed, since the scan synchronous with the ECG waveform cannot be performed, when a plurality of slices of the heart are imaged using a multi-slice scan technique, the cardiac stroke phases at the beginning of the respective scans become diverse. Accordingly, as shown in FIG. 15, the scans for slices 1 and 2, for example, are started at different cardiac stroke phases. However, either scan time is one cardiac stroke time T.

If the centrally weighted locations for the view data acquired by such a multi-slice technique are defined at the same relative time within the respective scan times, tomographic images for the slices are different in cardiac stroke phase, resulting in inconvenience in observing all the slices from first to last.

Then, as exemplarily shown in FIG. 15, if a tomographic image for the slice 1 is reconstructed with the centrally weighted location defined at a relative time $t_c$ within the scan time, the centrally weighted location for the slice 2 scanned n strokes (n is a natural number) later is defined at a time nT after the centrally weighted location $t_c$ defined for the slice 1.

Since the cardiac stroke phase corresponding to the location at the relative time $t_c$ for the slice 1 repeatedly appears at every time T, the phase at the time nT after the relative time $t_c$ is identical to the phase at the relative time $t_c$. Therefore, a tomographic image at the cardiac stroke phase the same as that of the slice 1 can be obtained based on the centrally weighted location defined at the time point as above.

Also, by defining the centrally weighted locations for the slices subsequent to the above in the same manner according to the measured value of the heart rate, the tomographic images for all the slices can be provided with a common cardiac stroke phase.

Although the above description is made on the case in which x-rays are employed as radiation, the radiation is not limited to x-rays but may be any other type of radiation such as γ-rays. However, x-rays are currently preferred since practical means for generating, detecting and controlling x-rays are most widely available.

Many widely different embodiments of the invention may be configured without departing from the spirit and the scope of the present invention. It should be understood that the present invention is not limited to the specific embodiments described in the specification, except as defined in the appended claims.

We claim:

1. A radiation tomography method comprising the steps of:

measuring projection data representing a subject by radiation beams in a plurality of view directions around the subject;

calculating estimated projection data for each of the plurality of view directions by performing a weighting calculation on data elements of the projection data generated by radiations which transmit through a same path in opposite directions so that a desired time phase for the subject is centrally weighted; and producing a tomographic image of the subject based on the estimated projection data.

2. A radiation tomography apparatus comprising:

radiation beam generation means for generating a radiation beam;

measurement means for sequentially measuring projection data representing a subject by the radiation beam in a plurality of view directions around the subject;

estimated projection data calculation means for calculating estimated projection data for each of the plurality of view directions by performing a weighting calculation on data elements of the projection data generated by radiations which transmit through a same path in opposite directions;

control means for controlling the weighting calculation so that the weighting calculation is performed centered on a desired time phase for the subject; and image production means for producing a tomographic image of the subject based on the estimated projection data.

3. A radiation tomography apparatus of claim 2, wherein the radiation beam generation means generates a parallel beam.

4. A radiation tomography apparatus of claim 2, wherein the radiation beam generation means generates a fan beam.

5. A radiation tomography apparatus of claim 2, wherein the estimated projection data calculation means performs the weighting calculation by linear interpolation/extrapolation according to time phases at which the projection data which are opposite each other are acquired and the desired time phase.

6. A radiation tomography apparatus of claim 2, wherein the desired time phase for use in the control means is a time phase of the maximum expiration of the subject.

7. A radiation tomography apparatus of claim 2, wherein the desired time phase for use in the control means is defined at a plurality of points within one cardiac stroke of the subject.

8. A radiation tomography apparatus of claim 2 further comprising:

second image production means for producing a tomographic image of the subject based on the projection data for a plurality of views equivalent to those of a half rotation around the subject; and selection means for selecting the image production means or the second image production means to produce one of the tomographic images.

9. A radiation tomography apparatus of claim 2, wherein the desired time phase for use in the control means is defined at a plurality of points separated by intervals of a cardiac cycle of the subject, and a plurality of tomographic images produced by the image production means and corresponding to the plurality of time phases which are identical represent different locations in the subject.

* * * * *